United States Patent Office 3,248,207
Patented Apr. 26, 1966

3,248,207
METHOD TO TREAT PLANTS FOR A TRACE METAL DEFICIENCY AND COMPOSITIONS FOR SUCH TREATMENT
Martin Knell, Stillwater Hills, Ossining, N.Y., and Harry Kroll, Warwick, R.I.
No Drawing. Filed Mar. 30, 1962, Ser. No. 183,727
9 Claims. (Cl. 71—2.5)

This application is a continuation-in-part of our copending application Serial No. 729,263, now Patent No. 3,028,407, issued April 3, 1962.

This invention is that of a method of avoiding or alleviating or overcoming a deficiency in a polyvalent essential trace metal, and particularly iron, in a growing plant, by administering to the plant a polyvalent essential trace metal chelate, particularly an iron, and especially the ferric, chelate, and/or any water-soluble salt of any said chelate, of ethylene bis(alpha-imino-ortho-hydroxyphenylacetic acid)-monoamide (hereinafter briefly called "APCA-monoamide") and in a quantity at least sufficient to serve in avoiding or alleviating such deficiency.

The invention also is that of an agronomic composition effective in avoiding or alleviating and in overcoming such metal deficiency in growing plants, which composition comprises such APCA-monoamide, polyvalent metal, and particularly an iron, and especially ferric, chelate or any suitable water-soluble salt of any such chelate, along with a suitable compatible liquid or solid vehicle for said chelate and/or salt, and/or one or more other substances useful for the plant, for example, a fertilizer, or any compatible plant nutrient, insecticide, or fungicide. Such vehicle then can comprise an effective amount of at least one plant insecticide and/or plant fungicide.

The invention thus includes such composition containing a polyvalent essential metal chelate, such as an iron, and especially the ferric, chelate of APCA-monoamide and/or any such water-soluble salt of such chelate, for example, an alkali metal or ammonium salt; which composition is effective for avoiding or correcting an essential metal, such as an iron, deficiency in a growing plant having, or susceptible to, such a deficiency; as well as the method of avoiding or correcting such a deficiency of an essential metal, such as iron deficiency, in such a growing plant by administering to such plant a said composition containing a polyvalent essential metal chelate, such as an iron, and especially the ferric, APCA-monoamide chelate and/or any of these salts of any of them.

In an essential metal deficiency, for example, an iron deficiency such as iron chlorosis (the plant malnutritional condition due to iron deficiency of various economic crops), the area of the leaf between its veins is a marked yellow green in contrast to the dark green of the veins. In advanced iron deficiency, this contrast is lacking and instead the leaves have a generally overall ivory color, the plants become partially defoliated, and as a terminal result, will die. Any of several factors may cause such iron deficiency. Some of them are (1) an actual deficiency of iron in the soil, (2) high manganese and copper content of the soil, and (3) an alkaline soil (pH above 7.0), such as occurs from a high soil content of calcium carbonate.

Iron chelates of ethylene diamine tetraacetic acid (briefly called Fe–EDTA) have been tried and used with limited success, in central Florida, to alleviate mild to extreme conditions of iron chlorosis occurring in its orange and grapefruit groves. Despite the overcoming of the deleterious effects of iron deficiencies by applying iron-EDTA, its widespread use to maintain a normal state of iron balance in economic crops has been limited. This limitation results from its tendency to produce burns on contacting the fruit and leaves of the plant, and its inability, when used in economic amounts, to overcome iron chlorosis of plants grown in alkaline soils.

It has been estimated that about forty percent of the citrus plants in Florida suffer from marginal deficiencies of iron. However maintenance application of iron-EDTA is not practiced on them, despite the prospect of increased yields and improved quality of the crop. This is so because in either spray or soil application, contact of the iron-EDTA chelate with the fruit produces burns as well as premature dropping of unripe as well as of ripe fruit, and a down-grading of what otherwise might be considered normal fruit, with resultant economic loss to the grower.

Subsequently, attempts also were made to use the iron chelate of diethylenetriamine pentaacetic acid (briefly called iron-DTPA). It not only equals iron-EDTA in reducing chlorosis in iron deficient plants growing in acidic soils, but also iron-DTPA lacks its shortcomings and is more effective in alkaline soils while at the same time being much less toxic to the treated plant.

The polyvalent essential metal, such as an iron, and especially the ferric, chelate of APCA-monoamide used in the method as well as the compositions of this invention, including anw of the various water-soluble salts mentioned herein, likewise lack the various shortcomings of iron-EDTA. However, in contrast to the latter, the polyvalent metal such as iron, and especially the ferric, chelate of APCA-monoamide indicates greater effectiveness than iron-DTPA in overcoming, and also in avoiding the development of, chlorosis in plants growing in alkaline, e.g. calcareous, soils.

Such a polyvalent essential metal chelate, as an iron chelate, and especially the ferric chelate, of APCA-monoamide is not adsorbed by the soil when added to various alkaline soils having a high clay content. However, each of iron-EDTA, iron-DTPA, and monosodium ferrous N-hydroxyethylethylenediamine triacetic acid (briefly denoted sodium ferrous-HEEDTA) added separately to such soil is irreversibly adsorbed therein, and in the more alkaline soils breaks down to a hydrated iron oxide and respectively EDTA, DTPA, and monosodium-HEEDTA.

The iron, especially the ferric, chelate of APCA-monoamide indicates greater effectiveness in introducing iron into plant tissue than either iron-EDTA or iron-DTPA, or sodium ferrous-HEEDTA, in plants growing in alkaline soils.

A separate aqueous solution was prepared respectively of each of the chelates, namely: (1) ferric APCA-monoamide, (2) monosodium iron-EDTA, and (3) disodium iron-DTPA, and of (4) ferric chloride as a control; and in each of which the iron was isotopically labeled $Fe^{59}$, and ten milliliters of each such solution equaled ten milligrams of iron (showing approximately five microcuries activity), and an equimolar amount of the respective ligand (as to the first three solutions).

A separate ten milliliter aliquot of each of these solutions was mixed thoroughly respectively separately with one pint each of two different soils, namely, (a) East Coast Florida soil of about pH 7.7, and (b) a Utah calcareous soil of about pH 7.5. Then four Lima bean plant seeds were allowed to germinate and grow in each of these eight treated soil portions. Four replications were employed.

After about a month's growth, the resulting plants were harvested, dried, and the primary leaves were collected from each batch separately. Each of these separate batches of primary leaves then was ground separately in a Wiley mill through a number twenty screen. Then the same weight of about two-tenths to four-tenths of a gram sample of each respectively was weighed into a separate standard 15 x 125 millimeter test-tube, and its radioactive counting rate determined by inserting each test-tube in turn in to the well of a Nuclear Chemical Corporation Model DS–3 scintillation counter.

The count rate in each sample was translated into micrograms of iron by comparison with an aliquot of the respective original iron-chelate or ferric chloride solution. The resulting concentration of iron (in parts per million) in each batch of primary leaves of these plants, due to the use of the respective iron chelate or ferric chloride in each of the two soils is shown in the following table:

Iron-containing agent used:
  Florida soil samples—
    Ferric APCA-monoamide chelate _____ 30
    NaFe-EDTA, _____ 22
    $Na_2Fe$-DTPA _____ 28.1
    $FeCl_3$ (control) _____ 1.5
  Utah soil samples—
    Ferric APCA-monoamide chelate _____ 63
    NaFe-EDTA _____ 21.9
    $Na_2Fe$-DTPA _____ 50
    $FeCl_3$ (control) _____ 1.6

Moreover, while iron-DTPA is less phytotoxic than iron-EDTA, and than sodium iron-HEEDTA, the iron chelate, such as the APCA-monoamide ferric chelate, gives indications of showing a higher phyto-therapeutic index than that of these other substances that have been used. In view of the foregoing, it may develop to be possible to apply, for example, the APCA-monoamide ferric chelate in a proportion of possibly up to one thousand parts per million parts of soil (i.e. up to one-tenth percent of the soil) with no phytotoxicity. Yet each of iron-EDTA, iron-HEEDTA, and iron-DTPA is phytotoxic at a far lower concentration.

A wide variety of plants and vegetation can be treated with the iron chelate, and especially the ferric chelate of APCA-monoamide, with favorable results, and especially in iron deficient and also alkaline and calcareous soils. Such plants and vegetation include deciduous fruit plants, stone fruits, vegetables, ornamental flowers and shrubs, and grasses. All citrus plants that exhibit a chlorotic condition, whether grown on acid, alkaline or neutral soils, should be found to respond favorably to these iron chelates. Among them are grapefruit, oranges, tangerines, lemons and limes, and particularly those grown on alkaline soils. Chlorotic avocados and pineapples also should be found to respond favorably.

The invention with respect to various embodiments of compositions embraced by it, and also as to its method, is illustrated by, but not restricted to, the following examples which are preceded by a description of the prearation of an example of a polyvalent metal APCA-monoamide, especially its ferric, chelate:

*Ferric chelate of APCA-monoamide.*—APCA-monoamide dihydrochloride was prepared by the method of Example 1 of my copending application Serial No. 729,623, now Patent No. 3,028,407, on April 3, 1962. Two hundred and twenty-one grams (0.5 mole) of APCA-monoamide dihydrochloride were stirred up in one liter of water. While stirring that slurry, there was added one hundred and thirty-five grams (0.5 mole) of powdered ferric chloride (hexahydrate), which immediately produced a deep reddish-purple color. Then there was added two hundred grams of a fifty percent solution of sodium hydroxide (2.5 moles), and the exothermic reaction was cooled by immersing the reaction vessel in a cold water-bath.

After the reaction was completed, the precipitated (solid) chelate was filtered off, washed to remove water-soluble salts of the reaction and dried. Because of the proportion of sodium hydroxide used, the end product was the ferric chelate of APCA-monoamide.

The corresponding ferrous chelate is similarly prepared, but due to its ready oxidation to the ferric chelate, it is best prepared in an inert atmosphere (using, for example, carbon dioxide or nitrogen). Instead of the iron chloride, any other water-soluble iron salt (either ferric or ferrous, depending on the particular chelate desired) can be used, such as the sulfate, nitrate, or acetate. Any of them can be added in powdered form or dissolved in water.

The corresponding chelate with any other polyvalent essential metal is prepared by using a corresponding water-soluble salt of it and following the same or similar procedure.

Any water-soluble salt of such a polyvalent essential metal chelate of APCA-monoamide with a cation innocuous to the plant, e.g. an alkali metal or ammonium salt, can be prepared by converting its said metal chelate to the desired salt. That is done by treatment with the correspondingly required molal equivalent of the base to give the desired cation, such as an alkali metal or ammonium hydroxide, for example, by adding to an aqueous slurry of the essential metal chelate the required molal equivalent of, say, sodium hydroxide dispersed or dissolved in a minimum amount of water, and separating the resulting sodium salt of the APCA-monoamide metal chelate. This salt of the chelate then can be separated, for example, by evaporating the reaction mixture to dryness. In like manner, by replacing the sodium hydroxide in this procedure by the corresponding molal equivalent of potassium hydroxide or of any other alkali metal hydroxide or of ammonium hydroxide, or other required base whose cation is monovalent and innocuous to the plant, there is obtained similarly the corresponding potassium, or other alkali metal, or ammonium, or other salt of such polyvalent essential metal APCA-monoamide chelate.

The compositions embraced by the invention comprise any such polyvalent essential metal, as iron, and especially the ferric, APCA-monoamide chelate or any of the just above indicated salts, dispersed in a suitable compatible liquid or solid vehicle for it, or mixtures of any of said chelates and/or any of said salts. Such mixtures also can be dispersed in any such vehicle.

In being compatible, the selected vehicle should be not only inert to the chelate, with which it is used, but also innocuous to the plant, with which the composition is used.

Such vehicle can be an inert solid carrier such as any innocuous sand as vermiculite and others. It can be a solid carrier that is also useful to the plant or vegetation, such as a fertilizer or other plant food or solid nutrient. It can be an aqueous or other inert and innocuous liquid vehicle, in which the APCA-monoamide polyvalent essential metal, such as iron, chelate and/or any of said aforesaid salts, such as an alkali metal or ammonium salt, is or are dissolved or otherwise dispersed.

Any of these herein described compositions of matter of the invention can be prepared in administration units to facilitate their application to the chlorotic or chlorosis-susceptible plants to be treated. An advantageous administration unit contains from one one-hundredth to fifty percent of the iron APCA-monoamide chelate and/or any of such aforesaid salt of it, in uniform admixture with any of the foregoing described vehicles. Use of such administration unit not only enables an appropriate dose easily to be administered to the plant to be treated, but also enables administration by application to the soil to be done in uniform manner.

An advantageous administration unit form comprises an intimate admixture of the selected APCA-monoamide polyvalent metal such as iron, especially ferric, chelate of the invention with a so-called balanced fertilizer or, in suitable circumstances, with other plant food or fertilizer compositions. These also can be uniformly applied, as by a mechanical spreader. Still another advantageous administration unit form comprises a solution of such APCA-monoamide chelate (or any of the indicated salts) in a suitable liquid, such as water or an aqueous nutrient solution "wherein a nutrient for the plant is dissolved in an aqueous vehicle." This administration form enables controlled application by foliage spraying, and the like. The various administration unit forms may, if desired, comprise other inert or innocuous active materials.

The APCA-monoamide iron, particularly ferric, chelate or any of the available above-mentioned salts, or mixtures of any of them, can be applied to the plants or vegetation in any of a wide variety of ways. Presently-preferred methods of application are shown by the following:

A. *Soil applications*

(1) As a dry powder to the soil surface.

(2) In usually an aqueous dispersion or solution to the soil surface.

(a) For citrus trees, say, about ⅓ pound of the APCA-monoamide ferric chelate in 5 gallons of water per tree.

(b) For crop land, say, about 20 pounds of the APCA-monoamide ferric chelate per 200 gallons of water per acre.

(3) In dry form admixed with an inert carrier, for example:

(a) About ⅓ pound APCA-monoamide ferric chelate admixed with from about 4⅔ to about 7⅔ pounds of sand per citrus tree.

(4) In dry form admixed with suitable fertilizer:

(a) For citrus trees, say about ⅓ pound APCA-monoamide ferric chelate admixed with about 4⅔ pounds of a compatible fertilizer, such as a 13–0–13 (N–P–K) analysis fertilizer, per tree.

(b) For say, about 1 pound APCA-monoamide ferric chelate admixed with about 99 pounds of compatible suitable fertilizer, such as a 27–9–9 (N–P–K) analysis fertilizer, and apply to 300 square feet.

B. *Foliage applications*

(1) As a thorough cover spray containing from about 1 to about 4 pounds of the APCA-monoamide ferric chelate per 100 gallons of water.

(2) As a thorough cover spray containing from about 1 to 4 pounds of the APCA-monoamide ferric chelate and any of said noted salts of some other chelated minor essential metals at respectively recommended rates, per 100 gallons of water.

(3) As a thorough cover spray containing from about 1 to about 4 pounds of the APCA-monoamide iron chelate and/or any of the above-noted salts together with any compatible suitable water-dispersible or soluble insecticide and/or fungicide at recommended rates.

(4) Combination of 2 and 3 above.

C. *Injection applications*

(1) Injection in aqueous solution into stems or trunks of plants.

(2) Injection in dry form into stems or trunks of plants.

D. *Seed treatment*

Treatment of seeds of annual and perennial plants with an aqueous solution or slurry, or as dry powder.

Representative examples illustrating the method of the invention by employment of the compositions of the invention in correcting iron deficiencies in growing plants follows:

*Example 1.*—Iron deficient Eureka lemon trees growing on a sandy clay loam soil are treated with ½ pound of the APCA-monoamide ferric chelate per tree, applied alone to the surface of the soil beneath the trees. The APCA-monoamide ferric chelate eventually is dissolved in the moisture of the soil, and the resultant aqueous solution contains the ferric iron in a form which is available to the tree roots.

It is advantageous, after the application of the APCA-monoamide ferric chelate, thoroughly to water the soil down to a depth of at least 6 inches, thereby to bring the chelate closer to the tree roots. Possibly in about five weeks or so after the application, correction of the iron deficiency is apparent, as evidenced, inter alia, by the elimination of yellow areas from the foliage and the appearance of new dark green growth.

*Example 2.*—Iron deficient lemon trees are treated per tree, with ½ pound of the APCA-monoamide ferric chelate mixed uniformly with ½ pound of sand. The mix is applied to the soil surface, the inert sand facilitating uniform application. Correction of the iron deficiency is noted in the manner mentioned in Example 1.

*Example 3.*—A solution of ½ pound of the APCA-monoamide ferric chelate in 10 gallons of water is applied to the soil beneath an iron deficient apple tree. Correction of the deficiency can be noted in a period of about four weeks.

*Example 4.*—Soil application with a uniform mixture of ⅓ pound of the APCA-monoamide ferric chelate and 5 pounds of sand (6.2% of said chelate by weight) per tree can correct iron deficiency in orange trees within a period of about 5 weeks.

*Example 5.*—Iron deficient orange trees are treated with ⅓ pound of APCA-monoamide ferric chelate plus 4⅔ pounds of a 13–0–13 (N–P–K) fertilizer (6.6% of said chelate by weight) per tree. The material is applied to the soil beneath the trees by a fertilizer distributor. Correction of the iron deficiency should be obtained in about five weeks.

*Example 6.*—Iron deficient azaleas are treated with a uniform mixture of the APCA-monoamide ferric chelate and 99 pounds of a 27–9–9 (N–P–K) fertilizer (1.0% of said chelate by weight) as a soil application to 300 square feet. Correction of the iron deficiency should be noted within about a few weeks.

*Example 7.*—Iron deficient pasture is treated with 36 pounds of the APCA-monoamide ferric chelate in admixture with 800 pounds of a 5–10–5 (N–P–K) fertilizer (4.3% of said chelate by weight), as a soil application to one acre. Correction of the deficiency should be noted within about four weeks.

*Example 8.*—Iron deficient peach trees are given a thorough cover spray with a solution of 2 pounds of the APCA-monoamide ferric chelate in 100 gallons of water (0.24% of said chelate by weight). This foliage spray application should result in correction of the iron deficiency within about four weeks.

*Example 9.*—The APCA-monoamide ferric chelate used in a conventional aqueous nutrient solution at a concentration of 100 parts per million (0.01% APCA-monoamide ferric chelate by weight). Tomato plants grown in such solution should show no iron deficiency symptoms, whereas those grown in an identical aqueous nutrient solution containing no APCA-monoamide ferric chelate show severe iron deficiency.

Correspondingly similar results can be obtained by replacing the APCA-monoamide ferric chelate of Examples 1 through 9 in part or entirely by the respectively same weight as to iron of the ferrous chelate and/or any of the herein indicated salts of it, e.g. a sodium or potassium or ammonium salt of it. In each of the applications of the chelate or any such salt, or mixture of any thereof, to the soil in any of these examples, it is advanageous, although not requisite, to water in the agent applied to the soil.

In place of the azaleas of Example 6, its method, or the method of some of the other examples, can be used on any other ornamental bushes or plants. These include, among others, camelias, cherry laurel, chrysanthemum, ornamental citrus, carnations, gardenias, gladioli, hibiscus, holly, hydrangeas, ixora, ligustrum, pieris japonica, rhododendrons, roses, snapdragons, etc., also ornamental trees and large shrubs such inter alia as magnolia, pin oak, Russian olive, sandcherry, spruce, etc.

The APCA-monoamide iron chelate or any water-soluble salt thereof can be used by this invention for the treatment of iron-deficient lawns, essentially in the manner of Example 7. Vegetables which may be treated with an APCA-monoamide iron, especially ferric, chelate, for example, in the form of a side-dressing application and in admixture with a fertilizer, and applied possibly 4 weeks after planting, comprise cabbage, corn, peppers, watermelons (at, say, about 18 to about 36 pounds of the chelate per acre); snapbeans, carrots, cauliflower, eggplant (at, say, about 18 pounds per acre); summer squash (at, say, about 36 pounds per acre); and others.

The foregoing examples and the amplification of them thus illustrate the various types of compositions containing an APCA-monoamide iron chelate or salt thereof, or mixture of any of them, embraced by the invention.

Those examples thus illustrate the method of the invention as to alleviating or correcting or overcoming or avoiding an iron deficiency in a growing plant having or being susceptible to such deficiency, by administering to it an APCA-monoamide iron chelate in an amount, and at a regimen, at least sufficient to alleviate or avoid such deficiency in relation to the particular soil wherein the plant is grown.

Similar compositions containing an APCA-monoamide chelate of some other polyvalent essential metal, for example, an alkaline earth metal such as calcium with magnesium included with them, copper, zinc, or manganese, or admixed with, or replaced by, an alkali metal or ammonium salt of any of those metal chelates, also are part of the invention. The proportional content of any of these APCA-monoamide polyvalent essential metal chelates would be adjusted where necessary as influenced by the rate of uptake requirement of the specific other essential metal.

The method of the invention illustrated by the examples applies similarly to these and other polyvalent essential metal APCA-monoamide chelates.

Included among the polyvalent metal APCA-monoamide chelates are those of divalent metals such as the alkaline earth metals as barium, calcium, strontium, with magnesium included among them, the iron group metals iron, nickel, and cobalt, and others such as copper, zinc, and manganese, as well as other divalent metals. Also included are the APCA-monoamide chelates with higher than divalent metals, such as not only those with iron, cobalt, and manganese and others like them which also exist in the divalent state, but also those with metals that are only trivalent such as aluminum, as well as those of metals of any other valence, so long as it is polyvalent.

Any of these other chelates can be prepared, say, from its dihydrochloride, the base, or one of its water-soluble salts obtained by neutralization of its carboxyl group, or its phenolic hydroxyl, or both, generally by using a compatible water-soluble salt of the particular metal, in powdered form or dispersion or solution in a minimum amount of water, in place of the iron salt used in the method described at column 3.

In these APCA-monoamide chelates with a polyvalent metal, the linkage of that metal is by replacement not only of the hydrogen of the carboxyl group of its acetic acid residue, but also of the hydrogen of the phenolic ortho-hydroxyl group.

As already indicated, any of the other polyvalent essential metal chelates with APCA-monoamide, as well as any of the herein noted salts thereof, may replace the APCA-monoamide ferric chelate in suitable proportions, based on the particular metal, in the various compositions of the specific examples as well as in any of the herein above described methods of application or administration to the plant.

Moreover, the ligand is derived from the same sequestering agent, i.e. APCA-monoamide, in each of these different metal chelates and any of their water-soluble salts. Then the compositions of this invention can include along with an APCA-monoamide iron chelate also an effective concentration of a chelate with APCA-monoamide of any other of these polyvalent metals essential for the plant, or any of the herein noted water-soluble salts thereof. It can be included in such proportion as may be indicated by the relative uptake or need of such other essential metal to the need of the plant for iron.

Thus, the method of the invention also includes the administration of an APCA-monoamide iron chelate jointly with a chelate of APCA-monoamide with one or more of the other polyvalent essential metals for the plant.

While the invention has been described in relation to certain specific embodiments of it, it is understood that various substitutions and modifications can be made in the individual examples within the scope of the appending claims which are intended also to cover the equivalents of the specific embodiments.

What is claimed is:

1. The method of avoiding and alleviating a polyvalent essential trace metal deficiency in a growing plant susceptible to such deficiency, which method comprises administering to such plant a member of the class consisting of (a) a polyvalent essential trace metal chelate of ethylene bis - (alpha-imino-ortho-hydroxyphenylacetic acid)-monoamide, (b) a water-soluble salt of said polyvalent essential trace metal chelate, of a base whose cation is monovalent and innocuous to the plant, and (c) a mixture of any of (a) and (b), in an amount and at an administration regimen at least sufficient therefor in relation to the particular soil wherein said plant is grown to avoid and alleviate such deficiency in said plant.

2. The method of avoiding and alleviating an iron deficiency in a growing plant susceptible to such deficiency, which method comprises administering to such plant a member of the class consisting of (a) an iron chelate of ethylene bis-(alpha-imino-ortho-hydroxyphenylacetic acid)-monoamide, (b) a water-soluble salt of said iron chelate, of a base whose cation is monovalent and innocuous to the plant, and (c) a mixture of any of (a) and (b), in an amount and at an administration regimen at least sufficient therefor in relation to the particular soil wherein said plant is grown to avoid and alleviate such deficiency in said plant.

3. The method of avoiding and alleviating an iron deficiency in a growing plant susceptible to such deficiency, which method comprises administering to such plant the ferric chelate of ethylene bis-(alpha-imino-ortho-hydroxyphenylacetic acid)-monoamide, in an amount and at an administration regimen at least sufficient therefor in relation to the particular soil wherein said plant is grown to avoid and alleviate such deficiency in said plant.

4. The method of avoiding and alleviating an iron deficiency in a growing plant susceptible to such deficiency, which method comprises administering to such plant an iron chelate of ethylene bis-(alpha-imino-ortho-hydroxyphenylacetic acid)-monoamide, in an amount and at an administration regimen at least sufficient therefor in relation to the particular soil wherein said plant is grown to avoid and alleviate such deficiency in said plant.

5. A composition applicable to a growing plant susceptible to an iron deficiency, which composition comprises a member of the class consisting of (a) an iron chelate of ethylene bis-(alpha-imino-ortho-hydroxyphenylacetic acid)-monoamide, and (b) a water-soluble salt of said iron chelate of said monoamide, of a base whose cation is monovalent and innocuous to the plant; and (c) a mixture of any of (a) and (b); dispersed in a compatible vehicle which is inert to said iron chelate and to any said water-soluble salt thereof and also innocuous to the plant, and also dispersed in said vehicle at least one member of the class consisting of an insecticidally effective amount of a compatible plant insecticide and a fungicidally effective amount of a compatible plant fungicide; said composition being effective in avoiding and alleviating an iron deficiency in a growing plant in an amount and at an administration regimen at least sufficient therefor in relation to the particular soil wherein said plant is being grown.

6. A composition applicable to a growing plant susceptible to an iron deficiency, which composition comprises a member of the class consisting of (a) a ferric chelate of ethylene bis - (alpha - imino - ortho - hydroxyphenylacetic acid)-monoamide, (b) a water-soluble salt of said ferric chelate of said monoamide, of a base whose cation is monovalent and innocuous to the plant; and (c) a mixture of any of (a) and (b); dispersed in a compatible aqueous vehicle which is inert to said ferric chelate and to any said water-soluble salt thereof and also innocuous to the plant, and contains dissolved therein an effective amount of a nutrient for said plant; said composition being effective in avoiding and alleviating an iron deficiency in a growing plant susceptible to such deficiency when administered to said plant in an amount and at an administration regimen at least sufficient therefor in relation to the particular soil wherein said plant is being grown.

7. The method of avoiding and alleviating a polyvalent essential trace metal deficiency in a growing plant susceptible thereto, which method comprises administering to such plant a composition consisting essentially of
(i) a metal chelate-providing member of the class consisting of (a) a polyvalent essential trace metal chelate of ethylene bis-(alpha-imino-ortho-hydroxyphenylacetic acid)-monoamide, (b) a water-soluble salt of said polyvalent essential trace metal chelate, of a base whose cation is monovalent and innocuous to the plant, and (c) a mixture of any of (a) and (b) which member is dispersed in
(ii) a compatible solid vehicle which in inert thereto and also innocuous to said plant and is a member of the class consisting of an innocuous sand and a plant fertilizer; said composition containing said metal chelate-providing member in an effective concentration to enable avoiding and alleviating said polyvalent essential trace metal deficiency on administration of said compoistion to said plant in an amount and at an administration regimen at least sufficient in relation to the particular soil wherein said plant is grown for said member to avoid and alleviate such deficiency in said plant.

8. The method as claimed in claim 7, wherein said solid vehicle comprises a sand innocuous to the plant.

9. The method as claimed in claim 7, wherein said solid vehicle comprises a fertilizer for the plant.

References Cited by the Examiner
UNITED STATES PATENTS

| | | | |
|---|---|---|---|
| 2,824,128 | 2/1958 | Dexter | 260—439 X |
| 2,859,104 | 11/1958 | Kroll | 71—2.5 |
| 2,921,847 | 1/1960 | Knell et al. | 71—1 |
| 3,028,407 | 4/1962 | Knell et al. | 260—439 |

HOWARD R. CAINE, *Acting Primary Examiner.*

MAURICE A. BRINDISI, ANTHONY SCIAMANNA, A. LOUIS MONACELL, DONALL H. SYLVESTER,
*Examiners.*